(12) United States Patent
Barreau et al.

(10) Patent No.: US 10,325,038 B2
(45) Date of Patent: Jun. 18, 2019

(54) METHOD OF SIMULATING SHAPING A TEXTILE STRIP ON A MOLD PRESENTING A SURFACE OF REVOLUTION

(71) Applicant: SAFRAN AIRCRAFT ENGINES, Paris (FR)

(72) Inventors: Francis Barreau, Melun (FR); Yann Didier Simon Marchal, Soisy sur Seine (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 307 days.

(21) Appl. No.: 15/115,115

(22) PCT Filed: Jan. 29, 2015

(86) PCT No.: PCT/FR2015/050205
§ 371 (c)(1),
(2) Date: Jul. 28, 2016

(87) PCT Pub. No.: WO2015/114259
PCT Pub. Date: Aug. 6, 2015

(65) Prior Publication Data
US 2017/0011152 A1 Jan. 12, 2017

(30) Foreign Application Priority Data
Jan. 29, 2014 (FR) .................................. 14 00226

(51) Int. Cl.
*G06F 17/50* (2006.01)

(52) U.S. Cl.
CPC ...... *G06F 17/5018* (2013.01); *G06F 17/5095* (2013.01); *G06F 2217/32* (2013.01); *G06F 2217/42* (2013.01)

(58) Field of Classification Search
CPC ............ G06F 17/5018; G06F 2217/42; G06F 17/5095; G06F 2217/32
USPC .................................................. 703/2, 8, 1
See application file for complete search history.

(56) References Cited

U.S. PATENT DOCUMENTS

2013/0166253 A1* 6/2013 Bhalsod .............. G06F 17/5018
703/1
2015/0044415 A1* 2/2015 Read ...................... D21H 11/18
428/116

OTHER PUBLICATIONS

International Search Report as issued in International Patent Application No. PCT/FR2015/050205, dated May 28, 2015.
(Continued)

*Primary Examiner* — Juan C Ochoa
(74) *Attorney, Agent, or Firm* — Pillsbury Winthrop Shaw Pittman LLP

(57) ABSTRACT

A method of simulating shaping a textile strip by winding on a mold presenting a surface of revolution is described. The textile strip is made by three-dimensional weaving between a plurality of layers of warp yarns and a plurality of layers of weft yarns, the warp yarn layers being interlinked by the weft yarn layers. For each warp yarn layer, the method includes positioning crossing points between at least some of the warp yarns of the warp yarn layer and at least some of the weft yarns, the warp yarns of the at least some of the warp yarns including a reference warp yarn having a determined axial position on the mold.

10 Claims, 5 Drawing Sheets

(56) References Cited

OTHER PUBLICATIONS

Sharma, S. B., et al., "Moulding Analysis of 3D Woven Composite Preforms: Mapping Algorithms," Sections—"Mapping Constrained Yarn Points" and "Mapping Unconstrained Points," Proc. 12th Int. Conf. Compos. Mater., Jul. 1999, XP055189502, pp. 1-10.

Aono, M., et al., "Fitting a woven-cloth model to a curved surface: mapping algorithms," Section—"Mapping Calculations," Computer-Aided Design, Elsevier Publishers, vol. 26, No. 4, Apr. 1994, XP000453445, pp. 278-292.

\* cited by examiner

METHOD OF SIMULATING SHAPING A TEXTILE STRIP ON A MOLD PRESENTING A SURFACE OF REVOLUTION

CROSS-REFERENCE TO RELATED APPLICATIONS

This is the U.S. National Stage of PCT/FR2015/050205, filed Jan. 29, 2015, which in turn claims priority to French Patent Application No. 1400226, filed Jan. 29, 2014, the entire contents of all applications are incorporated herein by reference in their entireties.

FIELD OF THE INVENTION

The present teaching relates to methods and non-transitory, computer-readable mediums storing instructions that, when executed, implement simulation of the shaping of a textile strip that, when shaped, forms the reinforcement fiber of a composite material fan casing for an aeroengine.

BACKGROUND OF THE INVENTION

The present invention relates to a method of simulating shaping a textile strip by winding it on a mold that presents the shape of a body of revolution, the textile strip being made by three-dimensional weaving between a plurality of warp yarn layers and a plurality of weft yarn layers, the warp yarn layers being interlinked by the weft yarns.

The invention finds a particular but non-exclusive application in predicting the registering faults that occur while a textile strip is being shaped by winding in order to form a fiber preform for a composite material part such as an aeroengine casing, e.g. a fan casing. Once the fiber preform has been shaped in this way, it is impregnated with a resin that is subsequently polymerized in order to form a body of revolution made out of organic matrix composite material.

At the end of weaving, the warp yarns, which are oriented in the winding direction, and the weft yarns of the textile strip are mutually orthogonal. In contrast, while the textile strip is being wound on the mold in the form of a body of revolution, registering faults appear in the strip. The term "registering fault" is used herein to mean any angle between a warp yarn and a weft yarn that differs from 90°, the initial angle of weaving between the warp yarns and the weft yarns. These registering faults vary with the portion of the texture under consideration. When they become excessive, registering faults can degrade the mechanical strength properties of the part, e.g. by locally creating blocks of matrix without fibers, or conversely by creating zones having fibers at too great a concentration, thereby preventing good penetration of the resin.

It is therefore desirable to be able to simulate the shaping of a textile strip on a mold in the form of a body of revolution in order to evaluate the influence of the shaping on the orientation of the warp yarns and of the weft yarns in the strip, and in particular in order to evaluate the magnitude of any registering faults that might appear between the yarns.

OBJECT AND SUMMARY OF THE INVENTION

To this end, the invention provides a method of simulating shaping a textile strip by winding on a mold presenting a surface of revolution, the textile strip being made by three-dimensional weaving between a plurality of layers of warp yarns and a plurality of layers of weft yarns, the warp yarn layers being interlinked by the weft yarn layers, the method being characterized in that, for each warp yarn layer, it comprises positioning crossing points between at least some of the warp yarns of the warp yarn layer and at least some of the weft yarns, the warp yarns of said at least some of the warp yarns including a reference warp yarn having a determined axial position on the mold, the positions of these crossing points comprising, for each weft yarn of said at least some weft yarns:

- calculating a winding length increment for each warp yarn of said at least some warp yarns on the mold;
- positioning a reference crossing point corresponding to the crossing point between the weft yarn and the reference warp yarn;
- positioning current crossing points each corresponding to a crossing point between the weft yarn and a warp yarn of said at least some warp yarns, the positioning of the current crossing points being performed as a function of the position of the reference crossing point, of the winding length increment calculated for the warp yarn, and of the geometry of the surface on which the textile strip is laid, the reference crossing point and the current crossing points forming a row of crossing points in the direction of the weft yarn; and
- generating a three-dimensional mesh from finite elements of quadrangle type, each finite element being created from calculated crossing points, from calculated warp yarn length increments, and from the initial length of the weft yarn between each crossing point in each row of crossing points.

Thus, with the method of the invention, it is possible to simulate the relative positioning of the warp yarns and the weft yarns during winding of the fiber strip on a mold, and to deduce from this relative positioning the registering faults that appear in the textile strip while it is being shaped.

In an aspect of the simulation method of the invention, the textile strip has warp yarns of different lengths and a winding length increment for each warp yarn is calculated as a function of length ratios between warp yarns. Under such circumstances, the method of the invention is suitable for simulating the shaping of a fiber strip that is not plane at the end of weaving because of the presence of warp yarns of different lengths.

In another aspect of the method of the invention, a winding length increment for each warp yarn is also calculated using a first mode of calculating the length increment in which the winding length increment of the warp yarn under consideration is equal to the length increment of the reference warp yarn multiplied by the length ratio between the warp yarn under consideration and the reference warp yarn, and using a second mode of calculating the length increment in which the length increment of the warp yarn under consideration is equal to the length increment of the reference warp yarn multiplied by the ratio of the remaining lengths in the textile strip of the reference warp yarn and of the warp yarn under consideration, the transition between the first and second modes of calculation being made to be progressive by weighting the contributions of the first and second modes of calculation during winding. The simulation method of the invention in this example takes account of a phenomenon that the Proprietor has observed: the registering faults in the textile strip increase at the beginning of winding and subsequently decrease at the end of winding, which is due in particular to the fact that there is little or no tension in the strip at the beginning of winding so it can deform freely, whereas the tension is greater at the end of winding, at least because of the accumulation of turns on the mold.

While it is being wound on the mold, the distal end of the textile strip may be held by a device suitable for applying varying tension to the strip, thereby also having an influence on the increase and the decrease in registering faults respectively at the beginning and at the end of winding. Under such circumstances, the progressive transition between the first and second modes of calculating the length increment takes place by weighting the contributions of the first and second modes of calculation as a function of the tension applied to the strip.

Nevertheless, the textile strip may also be wound without tension or with tension that is constant. Under such circumstances, the progressive transition between the first and second modes of calculating the length increment is performed by weighting the contributions of the first and second calculation modes as a function of the progress of winding.

The axial position of the reference warp yarn may be constant throughout winding or it may vary during winding.

In another aspect of the method of the invention, the positioning of the crossing points is also performed as a function of a transition zone corresponding to passing from the end of one complete turn of the textile strip on the mold to the beginning of a following turn. Consequently, the method of the invention is suitable for simulating the shaping of the textile strip in a manner that is specific for each turn of the winding.

In another aspect of the method of the invention, the surface of the mold presents portions having different radii. The method can thus simulate shaping a textile strip on a mold that does not correspond to a perfect cylinder, as when making an aeroengine casing.

In a particular implementation, the various steps of the simulation method are determined by computer program instructions.

Consequently, the invention also provides a program on a data medium, the program being suitable for being performed in an estimator device or more generally in a computer, the program including instructions adapted to performing steps of an estimation method as described above.

The program may use any programming language, and it may be in the form of source code, object code, or code intermediate between source code and object code, such as in a partially compiled form, or in any other desirable form.

The invention also provides a data medium that is readable by a computer or by a microprocessor and that includes instructions for a program as mentioned above.

The data medium may be any entity or device capable of storing the program. For example, the medium may comprise storage means such as a read only memory (ROM), e.g. a compact disk (CD) ROM or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

BRIEF DESCRIPTION OF THE DRAWINGS

Other characteristics and advantages of the invention appear from the following description of particular implementations of the invention given as non-limiting examples and with reference to the accompanying drawings, in which.

DETAILED DESCRIPTION OF IMPLEMENTATIONS

The invention applies in general manner to simulating shaping a textile strip by winding on a mold presenting a surface of revolution, the textile strip being made by three-dimensional weaving between a plurality of warp yarn layers and a plurality of weft yarn layers.

The textile structure is made in known manner by weaving using a Jacquard type loom having arranged thereon a bundle of warp yarns or strands arranged in a plurality of layers, the warp yarns being interlinked by weft yarns. The fiber texture is made by three-dimensional weaving. The term "three-dimensional weaving" or "3D weaving" is used herein to designate a weave in which some of the weft yarns interlink warp yarns over a plurality of layers of warp yarns, or vice versa. An example of three-dimensional weaving is weaving using the interlock weave. The term "interlock weave" is used herein to mean a weave in which each layer of weft yarns interlinks a plurality of warp yarn layers with all of the yarns in a given weft column having the same movement in the weave plane.

While the textile strip is being woven, the weft yarns are introduced between the warp yarns in a direction that is orthogonal to the direction of the warp yarns. Consequently, at the end of weaving and prior to being wound on the mold, the textile strip has warp yarns and weft yarns that are orthogonal.

The method of the invention makes it possible to simulate the positioning between the warp yarns and the weft yarns of the textile strip after the strip has been wound on a mold in the form of a body of revolution, and it serves in particular to reveal any registering faults that might arise between the warp yarns and the weft yarns during such shaping. The term "registering fault" is used herein to mean any angle between a warp yarn and a weft yarn that departs from 90°, i.e. the initial weaving angle between the warp yarns and the weft yarns.

The steps of the simulation method of the invention described below may be performed by instructions of a computer program or corresponding simulation software. For this purpose, a computer type simulator device is used comprising in particular a processor, a read only memory, a random access memory, a volatile memory, and data input means. The read only memory of the simulator device constitutes a data medium in accordance with the invention that is readable by the processor and that stores a computer program or simulation software in accordance with the invention, comprising instructions for executing steps of an estimation method of the invention, as described below.

Figure 1:
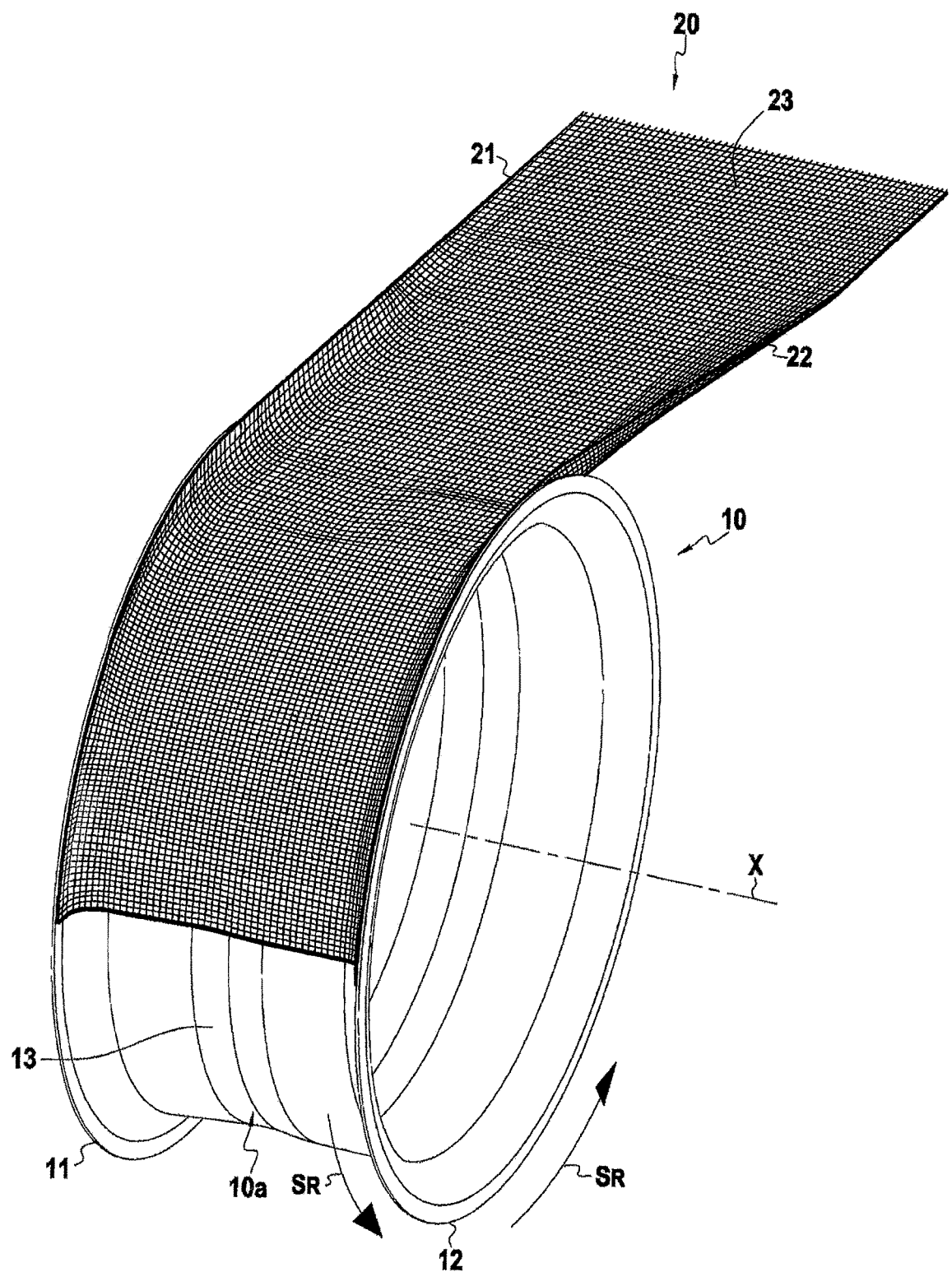
FIG. 1 is a diagrammatic perspective view showing a textile strip being shaped by being wound on a mold in the form of a body of revolution.

FIG. 1 shows a mold 10 for shaping a textile strip 20 by winding, the strip 20 being for forming the fiber reinforcement of a composite material fan casing for an aeroengine. The casing is made by injecting resin into the textile strip that has been shaped on the mold and by polymerizing said resin.

As shown in FIG. 1, the surface 10a of the mold 10 onto which the textile strip is to be wound does not correspond to a perfect cylinder, but includes vertical flanges 11 and 12 that are present respectively at the two ends of the mold. The central portion 13 of the mold 10 presents a surface that is close to horizontal, but that nevertheless includes variations in radii. Consequently, during shaping by winding, the method of the invention simulates the position of crossing points between warp yarns and weft yarns as a function of the shape of the surface onto which the textile strip is placed, this surface corresponding to the surface 10a of the mold 10 for the first winding turn and then to the surface of the textile strip wound during the preceding turn for each of the following turns.

The textile strip 20 is obtained by three-dimensional weaving using an interlock weave with warp yarns of length that differs as a function of their positions, i.e. as a function of the final radius of the corresponding portion of the part, specifically a casing. For example, the textile strip 20 has warp yarns that are longer in the selvages 21 and 22 than in the central portion 23 since the selvages 21 and 22 are to be shaped on the flanges 11 and 12 that present radii that are greater than the radii of the central portion 13 of the mold 10. The direction of rotation of the mold 10 is indicated by arrows SR in FIG. 1.

More precisely, and as explained in detail below, the method of the invention uses a purely geometrical method for simulating the positioning of crossing points between yarns, without performing any balancing calculation for the textile strip while it is being wound. The draping of the textile strip is calculated on the basis of a surface of revolution that corresponds to the surface onto which the strip is wound. The positioning of the warp yarns and of the weft yarns in the fiber strip is simulated by calculating the positions of the crossing points between the warp yarns and the weft yarns by projection of the textile strip onto the winding surface and by generating a three-dimensional mesh on the basis of finite elements of the quadrangle shell type. Each quadrangle has four nodes, each formed by a crossing point, the sides of each quadrangle being formed by the lengths of warp yarn and of weft yarn that are present between the nodes, i.e. between the crossing points.

Figure 2:
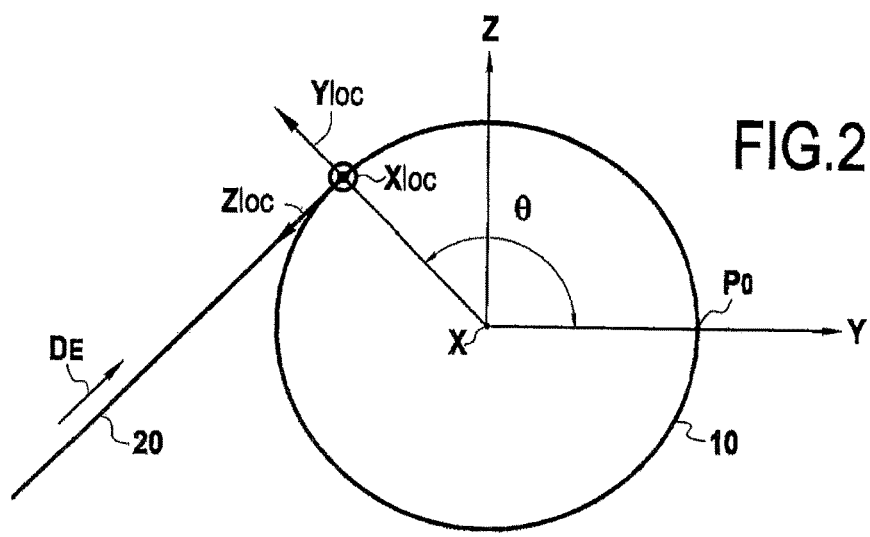
FIG. 2 is a diagram showing a system of cylindrical coordinates used by the method of simulating shaping a textile strip by winding on a mold of the invention.

The overall coordinate system used for the simulation is a system of cylindrical coordinates XYZ as shown in FIG. 2. The simulation software works in a local cylindrical reference frame having the following axes:

Xloc: direction parallel to the X axis of the mold 10 and to the axis of the drive shaft for driving the mold 10 in rotation during winding;

Yloc: radial direction; and

Zloc: tangential direction (to form a right-handed rectangular coordinate system). The tangential position of points created by the simulation software is represented by the winding angle θ.

In the simulation, the mold does not turn. It is the textile strip 20 that turns around the mold.

$D_E$ represents the tangential advance direction of the textile strip 20 on the mold 10, i.e. the winding direction of the strip. $D_E$ is directed in a direction opposite to the direction of rotation SR of the mold 10 as shown in FIG. 1.

The starting position $P_0$ of the winding is a fixed angular position. Winding begins at angular position 0°, i.e. the starting position $P_0$, in the overall coordinate system, which angle might possibly be modified by an initial tangential offset. Nevertheless, the position of the most recently wound point turns around the mold.

Once the geometrical positions of the points have been calculated, they remain unchanged during the remainder of the calculation.

Winding is done in the counterclockwise direction.

The warp yarns of the textile strip are wound in the tangential direction, while the weft yarns are positioned in a direction that is approximately parallel to the axis X of the mold 10.

Figure 3:
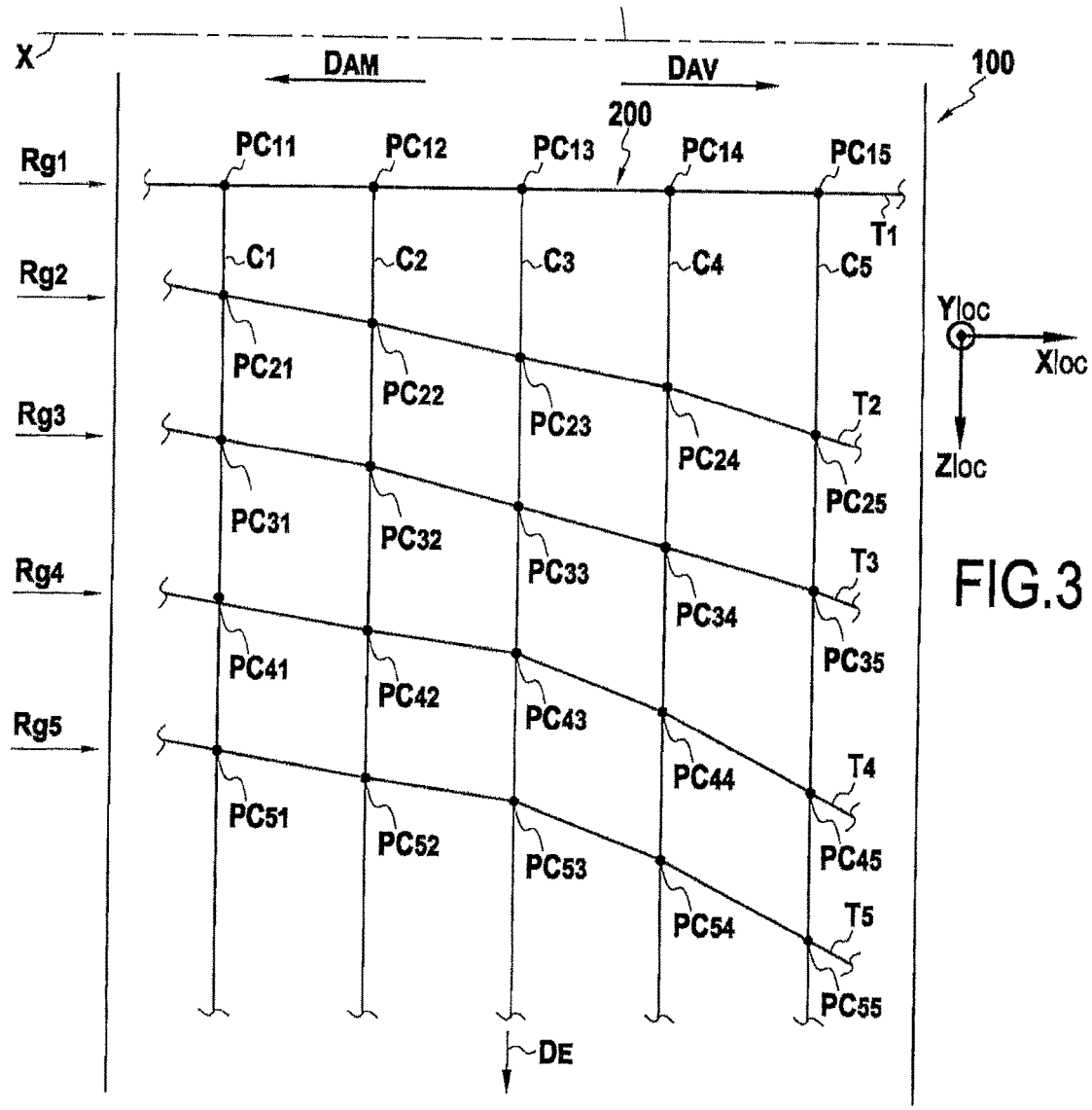
FIG. 3 is a diagrammatic view showing the positioning of crossing points between warp yarns and weft yarns in accordance with an implementation of the invention.

In the method of the invention, the positioning of the crossing points is determined from a reference warp yarn having a determined axial position on the mold. FIG. 3 shows in highly diagrammatic manner the principle of the calculation and the order in which each crossing point is positioned on a textile strip portion 200 that is wound on a mold 100 in the form of a body of revolution. Successive rows of crossing points are created in the tangential winding direction $D_E$ starting from the starting point of the winding.

For simplification purposes, only five warp yarns $C_1$ to $C_5$ and five weft yarns $T_1$ to $T_5$ are shown. In this example, the weft yarn $C_3$ represents the reference warp yarn, i.e. the warp yarn of axial position on the mold 100 that is identified throughout winding. The first row Rg1 of crossing points $PC_{11}$ to $PC_{15}$ corresponds to crossing points between the weft yarn $T_1$ and the warp yarns $C_1$ to $C_5$. This first row corresponds to the start of the winding, i.e. to the initial end of the textile strip 200 fastened on the surface of the mold 100.

The first row Rg1 of crossing points $PC_{11}$ to $PC_{15}$ is created in order to initialize calculation. This corresponds to the starting position $P_0$ shown in FIG. 2. This row is created on a zone that extends at the half-thickness level of the textile strip of the first winding turn of said strip on the mold (the strip is wound through a plurality of turns in order to form the final preform). In order to create this first row:

- in the calculation data of the simulation software, the user defines the positions of the points of curves defining the surface of the mold, i.e. the geometry or relief of the surface onto which the textile strip is to be wound, and the final surface of the casing that is to be made (i.e. the outside surface after the textile strip has been wound completely and the resin has been injected and polymerized in the shaped strip);
- the positions of the first row Rg1 are calculated between these two surfaces in a zone extending over the surface of the mold at a height corresponding to half the thickness of the textile strip, since this is the, first winding turn; and
- a tangential initial offset may be defined by the user in order to represent the fact that the fabric cannot be attached to the mold exactly along a weft yarn.

The software performing the method of the invention then calculates the position of each crossing point for each successive row of points, in this example the rows Rg2 to Rg5. For each of these rows, the software creates:

the reference crossing point which is positioned on the reference yarn. The axial position (Xloc) of this reference yarn is kept constant during calculation. This reference yarn is situated towards the middle (in the axial direction X) of the mold;

the other points of the row are created starting from the reference point and going in the upstream direction $D_{AM}$ of the mold and then going in the downstream direction $D_{AV}$ of the mold.

By way of example, for the second row of crossing points $PC_{21}$ to $PC_{25}$ corresponding to the crossing points between the weft yarn $T_2$ and the warp yarns $C_1$ to $C_5$, the software begins by calculating the position of a reference crossing point corresponding in this example to the point $PC_{23}$, i.e. the crossing point between the weft yarn $T_2$ and the reference warp yarn $C_3$. Thereafter the software calculates the positions of the other current crossing points in this second row from the position of the reference crossing point and as a function of warp yarn length increments calculated by the software for each row of crossing points and as a function of the geometry of the surface on which this portion of the textile strip is draped. For the second row of crossing points, the software calculates firstly the positions of the points $PC_{22}$ and $PC_{21}$ situated on the upstream side of the reference crossing point $PC_{23}$, and secondly it calculates the positions of the crossing points $PC_{24}$ and $PC_{25}$ situated on the downstream side of the reference crossing point $PC_{23}$. The software performs the same positioning calculations for the points $PC_{31}$ to $PC_{35}$, $PC_{41}$ to $PC_{45}$, and $PC_{51}$ to $PC_{55}$, corresponding respectively to the third, fourth, and fifth rows of crossing points in the winding direction.

The distance in the axial direction, i.e. in the weft direction, between two adjacent crossing points is equal to the spacing between the two corresponding warp yarns, which distance may vary as a function of variation in the radius of the mold between the two crossing points. The positions of the warp yarns relative to the weft yarns are then deduced from the positioned crossing points, the length of the weft yarns initially present between the warp yarns being conserved. Specifically, by conserving curvilinear abscissa positions for the rows of crossing points representing the weft yarns, it is possible to comply with the principle of the weft yarns not slipping relative to the warp yarns at the crossing points between these yarns.

It is thus possible to simulate the registering faults that might occur in the textile strip while it is being shaped by being wound on the mold.

From the crossing points as obtained in this way, the simulation software can generate a three-dimensional mesh with finite elements of the type comprising shells formed by quadrangles of sides that define the directions of the yarns. Once the crossing points have been calculated, they are no longer modified in order to comply with the fact that the wound textile strip does not slip.

For each new row of crossing points added by the software, the software calculates warp yarn length increments. These increments define the lengths of the sides of the finite elements of the shell mesh (quadrangles) in the warp direction produced by the software. The calculation of these increments depends on the relative lengths between the warp yarns.

The axial position (Xloc) of each reference crossing point on the reference yarn corresponds to the axial position of the yarn, which is constant and defined by the user in the calculation data.

The tangential position (Zloc) of the reference point in row n (for a winding angle $\theta_n$) is equal to:

$$\theta_n = \theta_{n-1} + d\theta$$

where dθ is the winding angle increment defined by the user between two rows of crossing points.

For the first reference crossing point, the winding angle is zero by default or equal to an initial tangential offset, if any, as defined by the user in the calculation data.

The radial position $R_n$ (Yloc) of the reference crossing point is defined as follows:

$$R_n = (R_k \times (\beta_{max} - \beta_n) + R_{k+1}(\beta_n - \beta_{min}))/(\beta_{max} - \beta_{min})$$

if:

$$\beta_{min} <= \beta_n <= \beta_{max}$$

else:

$$R_n = R_k$$

With:

$\beta_{min}$ and $\beta_{max}$ are angles defining the tangential position of the transition zone for passing from turn k to turn k+1;

k is the index of the current winding turn being calculated. Outside the transition zone, k corresponds to the index of the turn in which the reference point is situated. Otherwise calculation is taking place in the transition zone corresponding to passage from turn k to turn k+1;

$R_k$ is the radius of the reference crossing points for turn k. $R_k$=the radius of the surface of the mold at the axial position (Xloc) of the crossing point under consideration+((k−1)×thickness of the textile strip)+½ thickness of the textile strip.

The radius of the mold surface used for calculating $R_k$ comes from the calculation data as previously input by the user. Before the simulation, the user enters the value of the mold radius corresponding to the axial position of a crossing point, specifically the axial position of the reference crossing point.

With these definitions, the new row Rgn is calculated with a yarn length increment $dL_n$ for the reference warp yarn that is equal to:

$$dL_n = d\beta \times R_n$$

Figure 4:
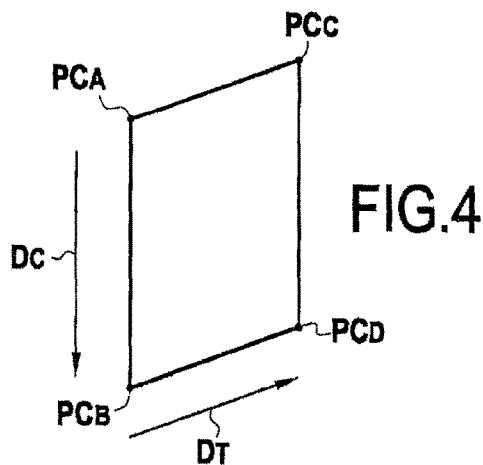
FIG. 4 shows an example of determining the position of a current crossing point in the method of the invention.

After calculating the position of the crossing point on the reference warp yarn, the simulation software calculates the positions of the other crossing points referred to as "current" crossing points along the row in question. FIG. 4 shows an example of calculating current crossing points. In this example, it is assumed that the three crossing points $PC_A$, $PC_B$, and $PC_C$ have already been created. The crossing points $PC_A$ and $PC_C$ are two consecutive points along the row n−1, e.g. points of the first row of crossing points (row Rg1 in FIG. 2) or of some other row of crossing points that has already been created. The crossing point $PC_B$ is a point of the following row n in the warp direction Dc. It is desired to calculate the position of the new crossing point $PC_D$, which is the crossing point following the point $PC_B$ in the row n. The points $PC_A$ and $PC_B$ may be reference crossing points or current crossing points. Consequently, the current crossing points may be determined directly or indirectly as a function of the reference crossing point. Specifically, if the current crossing point having coordinates that are to be determined is adjacent to the reference crossing point in the row of points under consideration, the current crossing point is positioned as a function of the position of the reference crossing point. Otherwise, if the current crossing point of coordinates that are to be determined is not adjacent to the reference crossing point of the row of points under consideration, the current crossing point is positioned as a function of the position of the adjacent current crossing point that has already been calculated directly or indirectly from the position of the reference crossing point. The position of a current crossing point is calculated step by step.

$PC_D$ is determined such that:

[$PC_B$, $PC_D$]=[$PC_A$, $PC_C$]=conserving curvilinear abscissa positions along the weft direction $D_T$. This serves to determine the axial position (Xloc) of the point $PC_D$;

[$PC_B$, $PC_D$]=length increment of the warp yarn under consideration. This determines the tangential position (Zloc) of the point $PC_D$.

The radial position (Yloc) of the point $PC_D$ is initially determined as corresponding to the radial position in the plane formed by the points $PC_A$, $PC_B$, and $PC_C$ for which the cylindrical coordinates (Xloc, Yloc, Zloc) are known.

The textile strip that is to be wound on the mold is woven in such a manner that the warp yarn lengths differ depending on the positions of these yarns (differential yarn take-up technology). For example, the warp yarn lengths may be longer in the side flanges of the mold (flanges 11 and 12 in FIG. 1) than in the central portion since the radii of the crossing points on the flanges are greater than the radii on the crossing points on the central portion. The simulation software takes this length difference into account when calculating warp yarn length increments. The user defines the warp yarn length ratios in the calculation data.

The calculation software then corrects the position of the previously determined point $PC_D$ by taking account of the thickness of the fiber strip that has already been wound before the current winding turn. This correction relates mainly to the radial position of the point $PC_D$, which needs to be determined in an orthogonal projection from the surface of the mold in the axial position under consideration.

Figure 5:
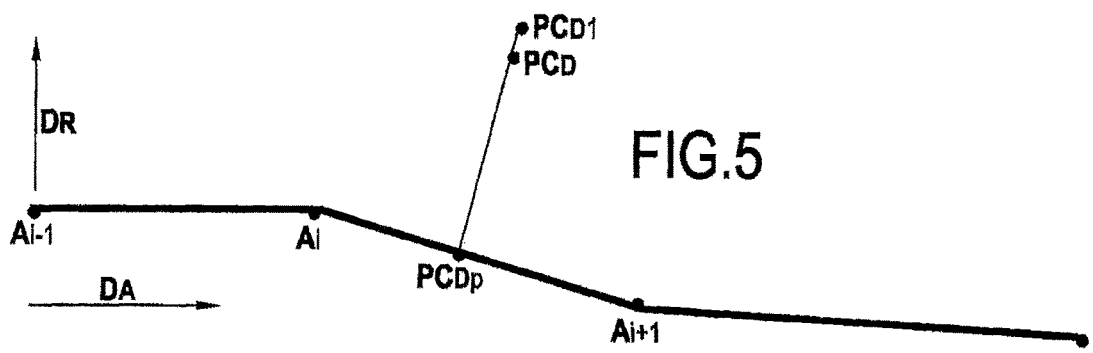
FIG. 5 shows an example of correcting the position of a crossing point as a function of the thickness of textile strips already wound and as a function of the winding geometry.

An example of position correction is shown in FIG. 5. The points $A_{i-1}$, $A_i$, and $A_{i+1}$ are successive points defining the curvature of the surface of the mold in the axial and radial directions $D_A$ and $D_R$ of the mold. These points are defined in the calculation data of the simulation software. The point $PC_D$ is the point obtained by calculation in the above-described step. The point $PC_{Dp}$ is the projection of the point $PC_D$ onto one of the segments of the curvature of the bottom surface of the mold. The point $PC_{D1}$ is situated on the segment [$PC_{Dp}$, $PC_D$], and the length ($PC_{Dp}$, $PC_{D1}$) is equal to the thickness of the fabric at the point $PC_D$. This thickness is equal:

to the thickness of the turns of textile strip already wound under the point $PC_D$, plus half the thickness of the turn to which the point $PC_D$ belongs; or if the point $PC_D$ is in the transition zone for passing from the turn k to the turn k+1, the thickness takes account of a linear transition for passing from the turn k to the turn k+1, using the above-described formula for the points of the reference warp yarn.

$PC_{D1}$ thus corresponds to the consolidated radial position (Yloc) of the point $PC_D$.

The calculation of the yarn length increments must also take account of how winding is progressing in order to provide a good simulation. Specifically, the Proprietor has observed that the amplitude of the registering faults varies in non-uniform manner during winding. In a particular implementation, the method of the invention and the associated software can thus take account of the fact that the portion of the textile strip that remains to be wound is attached at its end and that towards the end of winding this end approaches the fabric winding zone, by calculating length increments in first and second molds of calculation. This fastening influences the positioning of the points and tends to straighten out any tangential offset that might have appeared during the calculation. This influence is taken into account in the second mode of calculation.

The first mode of calculation is used at the beginning of winding, i.e. when the distal end of the textile strip is still far away from the winding and the tension force in the textile strip is low. Under such circumstances, the textile strip can deform freely and the warp yarn length increment is equal to the length increment of the reference warp yarn multiplied by the ratio of the lengths between the two yarns, with the value of the ratio being given to the software as input data.

The second calculation mode is used as the end of winding when the end of the textile strip comes close to the winding zone and the tension force on the strip is large. Under such circumstances, the strip cannot deform freely and tends to straighten out, the deformation in the wound portion being similar to the deformation in the remaining portion of the strip. In this second mode, the length increment of a warp yarn is equal to the length increment of the reference yarn multiplied by the ratio of the length of remaining textile strip for these two yarns, the initial length of the strip being given to the software as input data.

The transition from the first calculation mode to the second calculation mode takes place progressively by applying variable weighting between these two calculation modes progressively as winding continue.

Figure 6A:
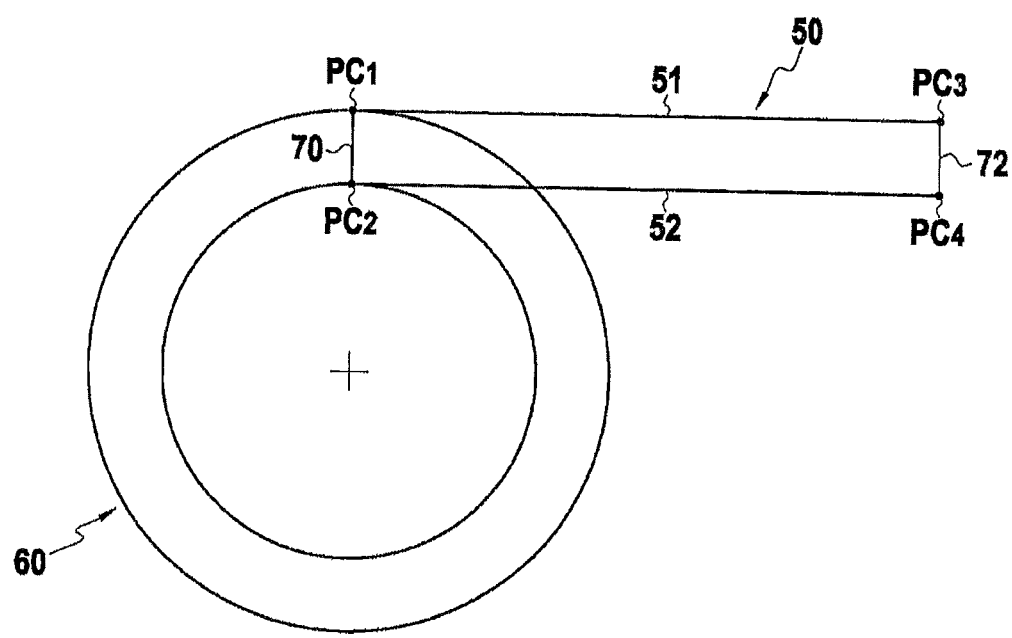
FIGS. 6A and 6B are diagrammatic views showing two warp yarns being wound on portions of a mold having different radii.
Figure 6B:
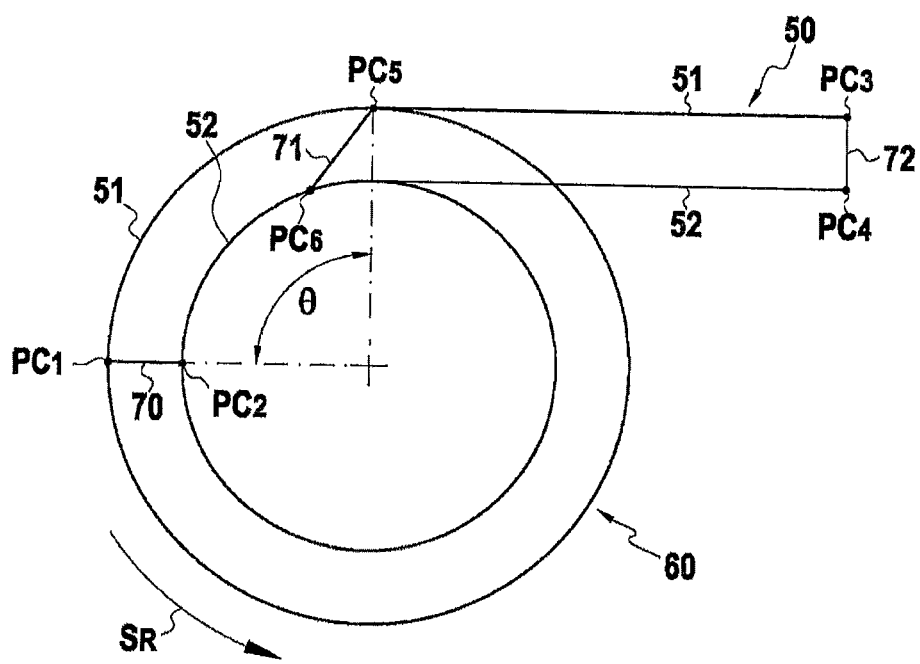

FIGS. 6A and 6B show an example of these two calculation modes. FIG. 6A shows the position of two warp yarns of a textile strip 50 at the beginning of being wound on a mold 60, the yarn 51 corresponding to the reference warp yarn and the yarn 52 corresponding to another warp yarn of the strip 50. The total length of the strip 50 at the beginning of winding is defined by the user in the calculation data for the simulation software. This length is defined for the reference warp yarn. The total length of the other warp yarn is deduced by multiplying the length of the reference warp yarn by the ratio of the length between each warp yarn and the reference warp yarn (likewise defined in the calculation data).

The points $PC_3$ and $PC_4$ correspond to the distal ends of the warp yarns 51 and 52 that are held by a movable system under tension control (not shown in FIGS. 6A and 6B). The points $PC_1$ and $PC_2$ correspond respectively to the proximal ends of the warp yarns 51 and 52 fastened to the mold 60.

A weft yarn 70 crosses the reference warp yarn 51 at the point $PC_1$ and the warp yarn 52 at the point $PC_2$. Likewise, a weft yarn 72 crosses the reference warp yarn 51 at the point $PC_3$ and the warp yarn 52 at the point $PC_4$.

FIG. 6B shows the positions of the warp yarns 51 and 52 after the strip has been wound through an angle θ. The reference warp yarn 51 is wound on a zone of the mold 60 having a radius greater than the zone of the mold on which the warp yarn 52 is wound.

After the textile strip 50 has been wound on the mold 60 through an angle θ, as shown in FIG. 3B, the points $PC_1$ and $PC_2$ have turned through the same angle θ and the points $PC_3$ and $PC_4$ have come closer to the already-wound portion of the strip. The points $PC_5$ and $PC_6$ correspond respectively to the crossing points between the reference warp yarn 51 and the warp yarn 52 with a weft yarn 71. In the example shown in FIG. 6B, although the point $PC_5$ corresponds to the point of tangency of the reference warp yarn 51 with the mold 60 after winding the textile strip 50 onto the mold 60 through an angle θ, the point $PC_6$ is already present in the portion of the strip 50 that has been wound on the mold 60, revealing the existence of a registering fault at this level in the textile strip. As a function of the registering fault, the point $PC_6$ could also be found in the portion of the textile strip 50 that has not yet been wound on the mold 60. Furthermore, if no registering fault is present in the crossing points between the warp yarns 51 and 52 and the weft yarn 71, then the points $PC_5$ and $PC_6$ would both correspond to the points of tangency of the yarns 51 and 52 with the mold 60.

Knowing the length increment $[PC_1, PC_5]$ of the reference warp yarn 51, the software can calculate the length increment $[PC_1, PC_6]$ of the warp yarn 52 using two defined calculation modes.

In the first calculation mode, the increment $[PC_2, PC_6]_1$ is equal to the increment $[PC_1, PC_5]$ multiplied by the ratio of the lengths of the warp yarns 51 and 52 given to the software as input data.

In the second calculation mode, the increment $[PC_2, PC_6]_2$ is equal to the increment $[PC_1, PC_5]$ multiplied by the ratio $[PC_6, PC_4]/[PC_5, PC_3]$ corresponding to the ratio of the remaining lengths of the warp yarns 51 and 52.

For each new crossing point, the simulation software calculates the length increments $[PC_2, PC_6]_1$ and $[PC_2, PC_6]_2$ using the two calculation modes and it combines them with a weighting function in order to determine the final length increment $[PC_2, PC_6]$. By way of non-limiting example, the final length increment $[PC_2, PC_6]$ may be determined as follows:

$$[PC_2, PC_6]=[PC_2, PC_6]_1 \times (1-a) + [PC_2, PC_6]_2 \times a$$

with a=(Force−MinForce)/(MaxForce−MinForce).

This weighting is performed as a function of the value of the traction force applied to the fabric. The way this force varies during the calculation is defined by the user in the software data. MaxForce and MinForce are the maximum and minimum values of the force, while Force is the current value. When the force is equal to the minimum force, the length increment $[PC_2, PC_6]$ is calculated using the first calculation mode only (a=0). When the force is equal to the maximum force, $[PC_2, PC_6]$ is calculated using the second calculation mode only (a=1).

Figure 7:
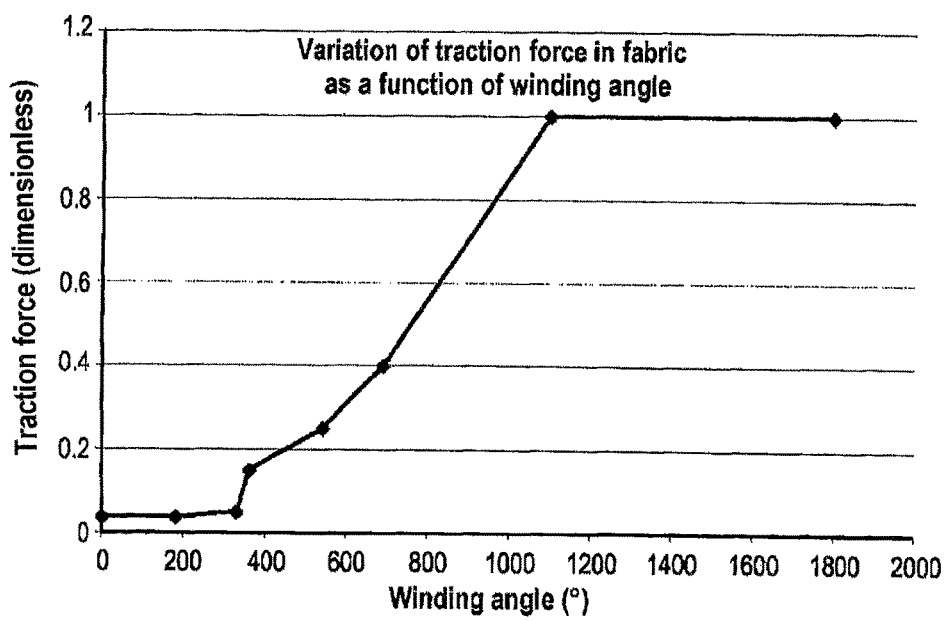
FIG. 7 is a graph plotting a curve showing an example of how the traction force on a textile strip varies as a function of the winding angle.

FIG. 7 shows an example of how the traction force varies as a function of the winding angle.

In a first winding configuration, the textile strip presents a defined length corresponding to the number of winding turns that are desired and it is held at its distal end throughout winding, e.g. by a tension-controlled movable system. In this configuration, the progressive transition between the first calculation mode and the second calculation mode is performed as a function of how tension force on the strip is controlled.

In another configuration, the length of the wound textile strip can be taken from a very long strip that is stored on a reel, and that is cut to length at the end of winding. In this configuration, the strip is wound without tension or with constant tension throughout the winding, with the progressive transition between the first calculation mode and the second calculation mode being managed as a function of how winding is progressing.

The method of the invention and its associated software are suitable for taking account of winding performed over a plurality of turns by identifying the position of the transition zones between two consecutive turns.

As mentioned above, and in order to enable the simulation software to calculate the positions of the crossing points and the finite elements of the three-dimensional mesh, data and/or parameters need to be provided to the simulator device. This data and/or parameters may be subdivided into three categories: data for defining the geometry of the casing, data for defining the textile strip, and parameters for controlling calculation.

The data for defining the geometry of the casing and progress of winding are as follows:
  the mold surfaces onto which the textile strip is to be shaped by winding;
  the number of winding turns; and
  the position of the transition zones between two consecutive turns.

For the winding surfaces of the mold, these may be derived from a computer-assisted design (CAD) model of the mold, e.g. produced using Catia® software. In the simulation software of the invention, these surfaces are defined as lines of intersection between these CAD surfaces and radial planes. A user then makes these lines discrete with finite element preprocessing software in order to define the starting positions of the warp yarns at the beginning of the first winding turn.

The data enabling the textile strip to be defined is as follows:
  the length ratios of the warp yarns;
  the initial length of the warp yarn between crossing points;
  the axial position of the reference warp yarn; and
  the initial length of the textile strip or the length taken for winding.

The length ratios of the warp yarns can be defined in two manners. In a first manner, they are calculated automatically by the software from the geometrical definition of the casing. The software then calculates the yarn lengths necessary to enable the surface of the mold to be draped without any registering faults. In a second manner, the warp yarn lengths are input by a user into the simulator device on the basis of measurements taken from prototypes of the part. These measurements may correspond to warp yarn length measurements taken during weaving of the textile strip or to measurements of registering faults taken during winding. The warp yarn length ratios can be deduced from such measurements of registering faults.

The calculation control parameters are as follows:
  the transition (weighting) between the first calculation mode and the second calculation mode (progress of winding, variation in tension force, etc.); and
  the number of crossing point rows per turn.

Figure 8:
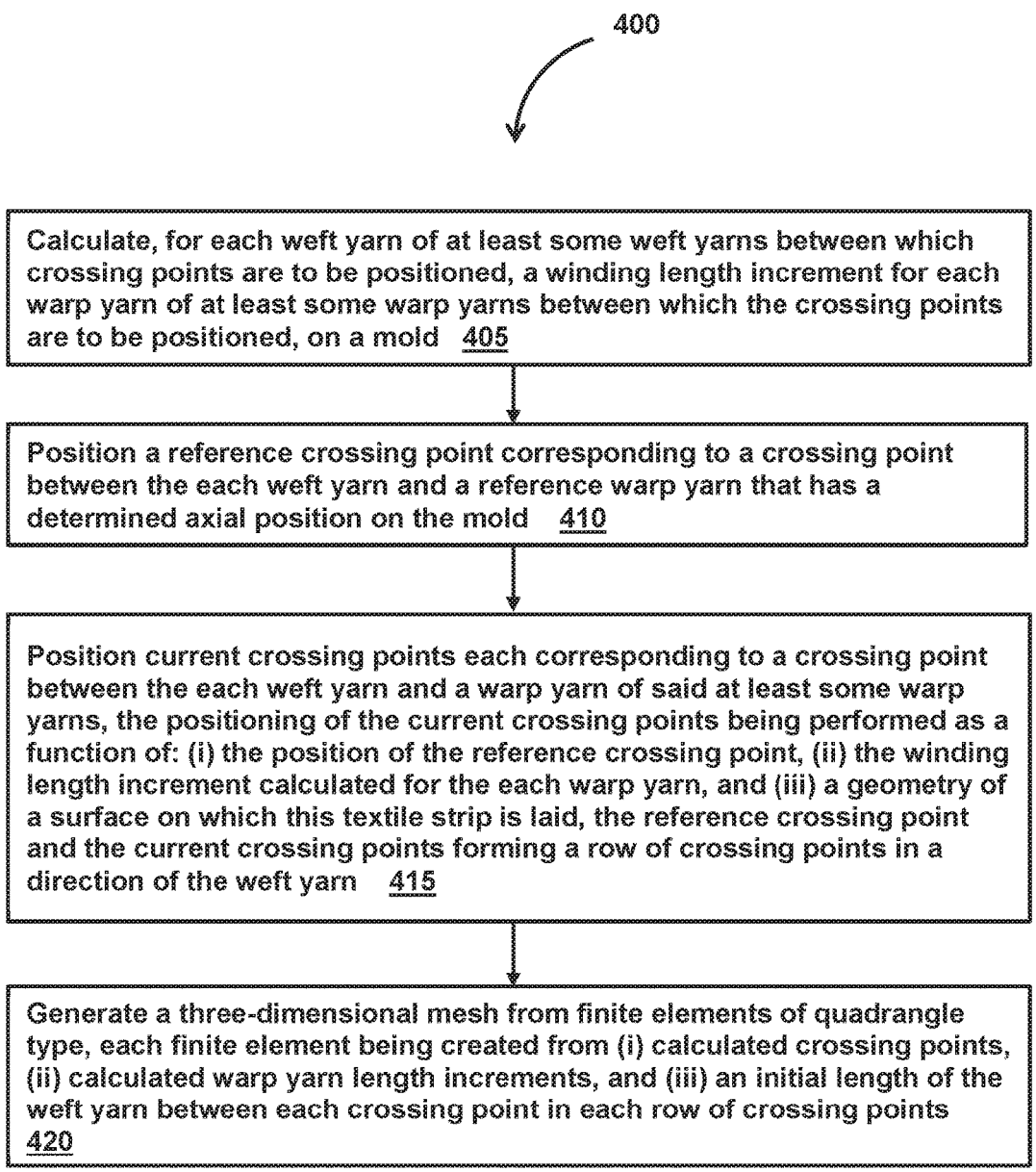
FIG. 8 is a flowchart of an exemplary process for simulating shaping a textile strip, according to an embodiment of the present teaching.

FIG. 8 is a flowchart of an exemplary process 400 for positioning crossing points between some warp and weft yarns in simulating shaping a textile strip, according to an embodiment of the present teaching. The process begins at step 405. At step 405, a computer or microprocessor implementing process 400 may calculate, for each weft yarn of said at least some weft yarns, a winding length increment for each warp yarn of said at least some warp yarns, on a mold. At step 410, the computer or microprocessor may position a reference crossing point corresponding to a crossing point between the each weft yarn and a reference warp yarn that has a determined axial position on the mold. At step 415, the computer or microprocessor may position current crossing points each corresponding to a crossing point between the each weft yarn and a warp yarn of said at least some warp yarns, the positioning of the current crossing points being performed as a function of: (i) the position of the reference crossing point, (ii) the winding length increment calculated for the each warp yarn, and (iii) a geometry of a surface on which this textile strip is laid, the reference crossing point and the current crossing points forming a row of crossing points in a direction of the weft yarn. At step 420, the computer or microprocessor may generate a three-dimensional mesh from finite elements of quadrangle type, each finite element being created from (i) calculated crossing points, (ii) calculated warp yarn length increments, and (iii) an initial length of the weft yarn between each crossing point in each row of crossing points.

The simulation software of the invention makes it possible in particular to produce data files relating to draping the strip on the mold, such as for example the angles that are present between the warp yarns and the weft yarns. This data can then be used with spread sheet software, such as Excel®, for example, in order to compare registering fault curves for calculated values and measured values. The data can also be produced in a file in a neutral format that can be viewed in software for making use of finite element results, thus making it possible to obtain maps of registering fault values turn by turn.

The invention claimed is:

1. A method for making a fiber preform, comprising:
    simulating using a computer a shaping of a textile strip by winding on a mold presenting a surface of revolution, the textile strip being made by three-dimensional weaving between a plurality of layers of warp yarns and a plurality of layers of weft yarns, the warp yarn layers being interlinked by the weft yarn layers, wherein, for each warp yarn layer, the simulating comprises
    positioning crossing points between at least some of the warp yarns of the warp yarn layer and at least some of the weft yarns, the warp yarns of said at least some of the warp yarns including a reference warp yarn having a determined axial position on the mold, the positioning of the crossing points comprising, for each weft yarn of said at least some weft yarns:
        calculating a winding length increment for each warp yarn of said at least some warp yarns on the mold;
        positioning a reference crossing point corresponding to the crossing point between the weft yarn and the reference warp yarn;
        positioning current crossing points each corresponding to a crossing point between the weft yarn and a warp yarn of said at least some warp yarns, the positioning of the current crossing points being performed as a function of the position of the reference crossing point, of the winding length increment calculated for the warp yarn, and of the geometry of the surface on which the textile strip is laid, the reference crossing point and the current crossing points forming a row of crossing points in the direction of the weft yarn; and
        generating a three-dimensional mesh from finite elements of quadrangle type, each finite element being created from calculated crossing points, from calculated warp yarn length increments, and from the initial length of the weft yarn between each crossing point in each row of crossing points, and
    manufacturing the fiber preform based on the generated three-dimensional mesh.

2. A method according to claim 1, wherein the textile strip comprises warp yarns of different lengths and wherein the winding length increment for each warp yarn is calculated as a function of length ratios between the warp yarns.

3. A method according to claim 2, wherein the winding length increment for each warp yarn is also calculated using a first mode of calculating a length increment in which the winding length increment of the warp yarn under consideration is equal to a length increment of the reference warp yarn multiplied by the length ratio between the warp yarn under consideration and the reference warp yarn, and using a second mode of calculating the length increment in which the winding length increment of the warp yarn under consideration is equal to the length increment of the reference warp yarn multiplied by the ratio of the remaining lengths in the textile strip of the reference warp yarn and of the warp yarn under consideration, the transition between the first and second modes of calculation being made to be progressive by weighting the contributions of the first and second modes of calculation during winding.

4. A method according to claim 3, wherein the distal end of the textile strip is held by a device suitable for applying varying tension to the textile strip, and wherein the progressive transition between the first and second modes of calculating the length increment is performed by weighting the contributions of the first and second modes of calculation as a function of the tension applied to the textile strip.

5. A method according to claim 3, wherein the textile strip is wound without tension or with constant tension, and wherein the progressive transition between the first and second modes of calculating the length increment is performed by weighting the contributions of the first and second calculation modes as a function of the progress of winding.

6. A method according to claim 1, wherein the axial position of the reference warp yarn is constant throughout winding.

7. A method according to claim 1, wherein the axial position of the reference warp yarn varies during winding.

8. A method according to claim 4, wherein the positioning of the crossing points is also determined while taking account of the progressive variation in thickness in a transition zone corresponding to passing from the end of one complete turn of the textile strip on the mold to the beginning of a following turn.

9. A method according to claim 1, wherein the surface of the mold presents portions having different radii.

10. A non-transitory computer-readable medium including instructions for executing steps of the method according to claim 1 when said instructions are executed by a computer or a microprocessor.

* * * * *